Patented Mar. 27, 1923.

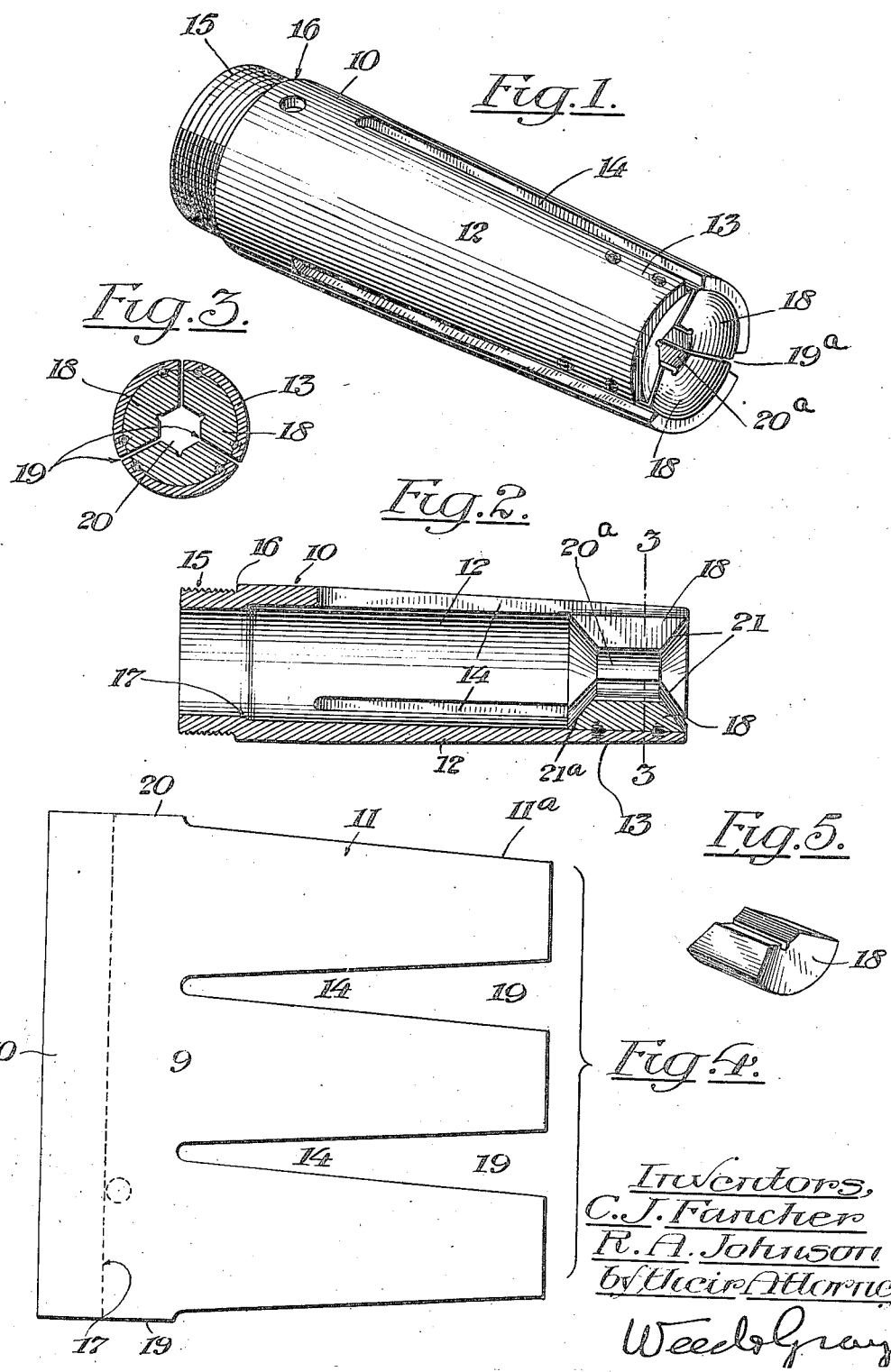

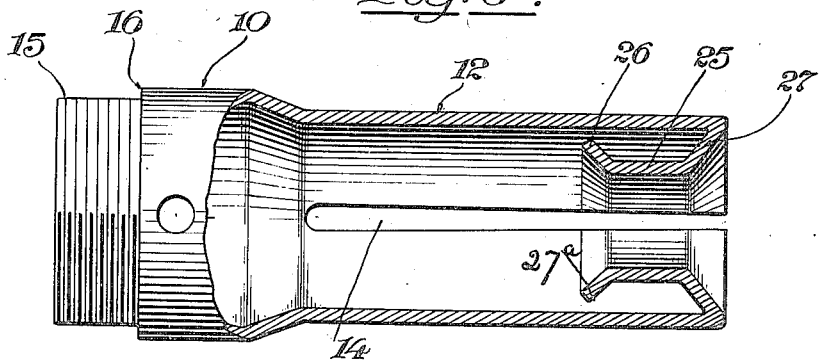
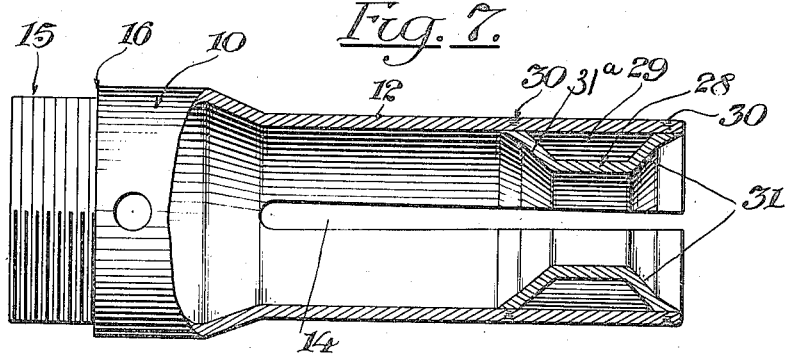
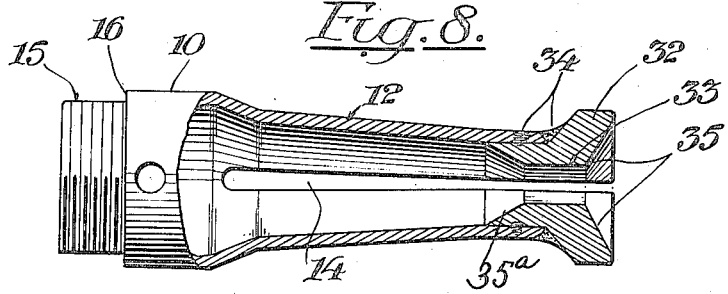
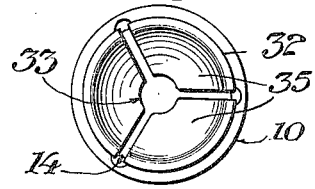

1,449,505

UNITED STATES PATENT OFFICE.

CHARLES J. FANCHER AND ROBERT A. JOHNSON, OF WINDSOR, VERMONT, ASSIGNORS TO THE NATIONAL ACME COMPANY, OF CLEVELAND, OHIO, A CORPORATION OF OHIO.

FEED COLLET AND METHOD OF MAKING THE SAME.

Application filed February 11, 1922. Serial No. 535,709.

*To all whom it may concern:*

Be it known that we, CHARLES J. FANCHER and ROBERT A. JOHNSON, both citizens of the United States, residing at Windsor, in the county of Windsor and State of Vermont, have invented certain new and useful Improvements in Feed Collets and Methods of Making the Same, of which the following is a specification.

This invention relates to feed collets or pushers and to the method of making the same, an object thereof being to provide a sheet steel or metal feed collet adapted to be used particularly with small sizes of stock, and which will be relatively economical and easy to manufacture, durable and long lived, and efficient in use. The feed collets or pushers contemplated in this invention are adapted particularly for use in various types of machines, such as metal working machines including automatic or hand operated screw machines, bar forming machines and the like, and constructed especially for the purpose of gripping and feeding the stock or work.

A further object of this invention is to provide a sheet steel or metal feed collet or pusher adapted for use in connection with any predetermined size of stock, the collet being constructed or produced from a so-called master collet of standard size, and formed by providing means for adjusting or varying the size of the gripping bore thereof to accommodate any predetermined size or shape of work. By virtue of this invention therefore, feed collets may be produced in large quantities in a single standard or uniform construction or size, which may be readily and inexpensively adapted for use with stock of any size, diameter or shape merely by securing within the gripping bore of the collet a filler means constructed to form a gripping bore of the desired diameter, shape or size.

Other objects of this invention will appear from the following description thereof, reference being had to the accompanying drawings forming a part of this specification, wherein like reference characters indicate corresponding parts in the several views, and wherein Fig. 1 is a perspective view of a feed collet embodying our invention; Fig. 2 is a longitudinal section thereof; Fig. 3 is a cross section taken on line 3—3 of Fig. 2; Fig. 4 is a plan view illustrating by way of example, a form of blank from which the collet may be formed; Fig. 5 is a detail view of a filler adapted to be secured within the gripping bore of the collet; Fig. 6 is a side view partly in section illustrating a modified form of our invention; Fig. 7 is a similar view illustrating a further modification; Fig. 8 is a similar view illustrating a still further modification; and Fig. 9 is an end view of the construction shown in Fig. 8.

The present improved feed collet as shown herein is formed or rolled up from a metal blank 9 struck from or stamped out from a piece of sheet metal, such as a pressed steel plate. The blank it will be noted comprises preferably a body portion 10, and a plurality of finger pieces 11 extending or projecting from one of the sides of the body. In the present instance the finger pieces 11 have tapered formations and terminate in gripping portions 11$^a$, but of course it will be understood that the same may be shaped in any desired manner in accordance with the preferred shape or construction of the collet.

In forming the master feed collet, the blank 9 is formed or rolled up by the application of suitable pressure into a shape substantially similar to that illustrated in Fig. 1. The body part 10 is thus formed into a substantially tubular, hollow, or cylindrical form having a lengthwise extending non-drilled bore therethrough. The contiguous edges 19 and 20 are then bent into juxtaposition and may, if desired, be connected in any suitable manner, such for instance as illustrated in our co-pending applications Serial No. 350,501 filed February 13, 1921, and Serial No. 417,646 filed October 18, 1920, for feed collets, and method of making feed collets respectively. The finger pieces 11 may then be bent, pressed or otherwise forced inwardly a suitable distance or shaped in any suitable manner so as to form the gripping fingers 12, and the portions 11$^a$ thereof are shaped in any preferred manner. In the present instance these portions form a substantially cylindrical or tubular gripping end 13 having a bore therethrough.

It will be noted that the several gripping fingers 12 are highly resilient and are separated by suitable lengthwise extending slots 14, the gripping end being provided in the present instance with suitable slots 19ª. In order to permit the attachment of the collet to the feed tube or other supporting member of the machine, the end of the collet is threaded as indicated at 15, and a shoulder 16 is formed in a suitable manner. As shown in Fig. 4, the blank 9 may be offset at 17 to form such shoulders whereby upon rolling up or coiling the blank the exterior shoulder 16 will be provided. In this manner more metal will be left under the threads, thereby strengthening the body of the collet than would otherwise be the case if the shoulder were formed by turning down on the outside prior to the threading.

The gripping end 13 of the collet, as hereinbefore stated, has a bore therethrough of suitable shape and size, herein shown as cylindrical and in order to accommodate or adapt the collet to any predetermined size of stock suitable independent and interchangeable means is secured within the gripping bore of the master collet, such in the present instance being in the form of a filler consisting of a plurality of filler sections, blocks or pads 18. As herein illustrated, each section or block 18 is segmental in formation, the outer surface being shaped to conform to the inner surface of the end of each finger 12 and the inner surface being shaped to conform to the shape or size of the work.

Thus, it will be seen that the sections 18 may be readily welded or otherwise secured within the gripping bore of the collet to the fingers 12, the said sections thus forming a bore 20ª of any desired size, shape or form in conformance with the particular stock or work. The outer surfaces of the filler sections 18 are tapered at 21 so as to form a tapered opening, and thus centralize the end of the stock bar and so prevent the waste end of the stock from jamming the collet after the bar has been fed completely through the collet, while the inner surfaces 21ª are likewise tapered to facilitate the feeding of each new stock bar into the collet by centralizing it.

In the modified form illustrated in Fig. 6, means is also provided for accommodating or adapting the collet to any predetermined size or shape of work. In this instance the ends of the gripping fingers 12 are bent inwardly as indicated at 26 to form a filler comprising a plurality of sections or pads 25 shaped to conform to the shape and size of the stock. Thus, these inwardly bent portions 25 it will be noted are themselves highly resilient, and hence in conjunction with the resiliency of the respective gripping fingers 12 will form gripping means of increased resiliency, which may especially be adapted for particular forms of work.

These gripping portions 25 furthermore are so constructed as to have inner and outer tapered faces 27 and 27ª respectively, thus forming tapered openings for the purposes hereinbefore described.

In the modified form illustrated in Fig. 7 the gripping fingers 12 of the collet are provided with a filler likewise formed of filler sections or pads 28, which are preferably hollow as indicated at 29, the same being spot-welded as at 30 to the ends of the fingers or secured in any other suitable manner. The sections 28 are also constructed so as to have tapered faces 31 and 31ª.

In the modified form illustrated in Fig. 8 the gripping fingers 12 are provided with an outwardly flaring filler also formed of sections, pads or blocks 32, a portion thereof extending into the bore of the collet and being spot-welded or otherwise secured thereto as at 34. The contiguous filler sections or members 32 are shaped to form a bore 33 of any preferred size, shape or form adapted to conform to the particular stock to be gripped and fed. The outer and inner faces of these members 32 are also machined as at 35 and 35ª so as to form tapered openings.

Thus, it will be seen that in this improvement the master collet is not only provided with means for varying the size or shape of the gripping bore, but also with means constructed to form a flaring working end, the tapered opening thereof having its greatest diameter greater than the diameter of the gripping bore of the collet.

As a result of the above construction, we have provided an improved feed collet formed from a metal blank bent or shaped into a hollow body having juxtaposed edges and a non-drilled bore, the collet having a gripping portion formed in several instances separate therefrom and secured to the collet and provided with means for varying the gripping bore thereof to conform to any predetermined size or shape of stock.

From the foregoing it will be seen that this improvement comprises a master collet to which separable and interchangeable sectional filler blocks, pads or members may be readily secured as for instance by spot welding (Figs. 1, 7 and 8). In other words, the collets may be made of a predetermined size and by having interchangeable sizes and shapes of filler members, the master collet can be quickly transferred into a collet adapted for the particular work desired, that is whether hexagon, oval or other shape of bars having various diameters. As the collet is made of sheet metal or sheet steel, obviously the thickness of this metal prohibits the integral formation of a filler since there is no metal from which such filler could be formed. In our prior case hereinbefore referred to, it was necessary to shape the ends of the fingers to the desired diameter and shape of the bar. Consequently collets had to be made for each shape of bar and each diameter of bar within certain limits, but by the present improvement the master collet can be quickly adapted for use with various diameters and shapes of bars by using the particular size of filler required. It will also be observed that in each instance the filler blocks are inserted into the bore formed by the spaced fingers of the collet for even in Fig. 6 the filler member is bent inwardly and inserted into the end of the collet, although in this instance the filler member is not separately formed as in all the other forms shown, and therefore this particular form is not so desirable nor as practicable for interchangeable use as the form shown in Fig. 1.

Although we have described our invention in its preferred form, it will be understood that we do not limit ourselves to the construction herein shown and described, except in so far as defined in the claims and embraced within the scope thereof.

We claim as our invention:

1. A sheet metal feed collet comprising a body portion and a gripping portion having a bore therethrough, and an insertable filler means within said gripping portion for varying the size of said bore to accommodate varying sizes of work.

2. A sheet metal feed collet comprising a body portion and a gripping portion having a bore therethrough, and an insertable sectional filler within said bore for varying the size thereof.

3. A sheet metal feed collet comprising a body portion and a gripping member extending therefrom and having an interior diameter adapted to interchangeably receive different sizes of insertable filler sections adapted to be secured thereto and shaped to conform to the shape of the work.

4. A feed collet comprising a body portion, a gripping portion extending therefrom, and insertable sectional filler means spot-welded to the inner face of said gripping portion for varying the size of the gripping bore therethrough.

5. A sheet metal feed collet comprising a body portion, spaced gripping fingers extending therefrom, and insertable means secured to said fingers and having gripping portions adapted to grip the work.

6. A sheet metal feed collet comprising a body portion and a resilient gripping portion having a lengthwise extending bore therethrough, and insertable segmental filler means secured to said gripping portion within the bore for gripping the work and constructed to form a bore of reduced size.

7. A sheet metal feed collet comprising a metal blank bent or shaped into a hollow body having a lengthwise extending bore and a gripping portion, and means secured thereto for varying the size of the gripping bore.

8. A feed collet comprising a metal blank bent or shaped into a hollow body having a lengthwise extending bore and a gripping portion, means secured to said gripping portion for reducing the size of the bore and having an outwardly flared working end.

9. A feed collet comprising a metal blank bent or shaped into a hollow body having a lengthwise extending bore and a gripping portion, means secured to said gripping portion for reducing the size of the bore and having an inwardly flared inner end.

10. A feed collet comprising a metal blank bent or shaped into a hollow body having a lengthwise extending bore and a gripping portion, means secured to said gripping portion for reducing the size of the bore and having inwardly and outwardly flared ends.

11. A feed collet comprising a hollow body having a lengthwise extending bore and a gripping member, and sheet metal means projecting into said bore and constructed to form a gripping bore of reduced size adapted to grip the work.

12. A feed collet comprising a sheet metal blank bent with the contiguous edges in position to form a bore therethrough and having a plurality of resilient gripping members, said collet having means at one end for attachment to its support, and insertable means secured to said gripping members and constructed to form a gripping bore of reduced size.

13. A sheet metal feed collet comprising a body portion and a resilient gripping portion, and a filler member secured to said gripping portion and having an outer surface conforming to the inner surface of the gripping portion and an inner surface conforming to the shape of the bar to be fed.

14. A master feed collet formed from sheet metal and comprising a hollow body portion, and a hollow resilient gripping portion having an insertable filler member therein and secured to the gripping portion thereby to lessen the diameter of the gripping portion of said master collet.

15. A master feed collet comprising a sheet metal blank bent or shaped into a hollow body portion and a hollow resilient gripping portion having an insertable filler member therein and secured to the gripping portion thereby to lessen the diameter of the gripping portion of said master collet, said filler member comprising a plurality of sectional members having flaring ends.

16. The method of forming a collet, which consists in stamping from sheet metal a blank comprising a body portion and projecting tapered finger pieces, then rolling said blank into tubular form thereby to have juxtaposed edges, then compressing the finger pieces to form spaced resilient fingers, then securing a filler member to each of said fingers thereby to form a gripping bore therethrough.

17. The method of forming a collet, which consists in stamping from sheet metal a blank comprising a body portion and a projecting portion, then bending said blank to form a hollow collet, and then securing to the inner face of said projecting member gripping means constructed to engage the work.

18. The method of making a master feed collet, which consists in forming a tubular member comprising a body portion and a gripping portion of greater interior diameter than the stock to be fed, and then inserting into and spot welding to said gripping portion a filler member thereby to decrease the diameter of said master collet.

19. The method of making a master feed collet, which consists in forming from sheet metal a tubular member comprising a body portion and a gripping portion of greater interior diameter than the stock to be fed, and then inserting into and securing to said gripping portion a filler member thereby to decrease the diameter of said master collet, said filler member comprising a plurality of sections having an outer surface conforming to the inner surface of the gripping portion of the master collet and an inner surface conforming to the shape of the stock to be fed.

20. The method of making feed collets, which consists in first providing a master collet formed from sheet metal and comprising a body portion and a projecting gripping portion and of a size adapted for use with various sizes and shapes of stock, and then transforming said master collet into a specific feed collet adapted for a particular size and shape of stock by providing the gripping portion thereof with a filler.

21. The method of making feed collets, which consists in first providing a master collet formed from sheet metal and comprising a body portion and a projecting gripping portion and of a size adapted for use with various sizes and shapes of stock, and then transforming said master collet into a specific feed collet adapted for a particular size and shape of stock by providing the gripping portion thereof with a filler comprising a plurality of sectional members having an outer face conforming to the inner face of the gripping portion and an inner face conforming to the shape of the stock and of a thickness to lessen the diameter of the master collet and also having flaring inner and outer ends.

Signed at Windsor, Vermont, this 23rd day of January, 1922.

CHARLES J. FANCHER.
ROBERT A. JOHNSON.